(12) United States Patent
Ushijima

(10) Patent No.: US 7,917,090 B2
(45) Date of Patent: Mar. 29, 2011

(54) PORTABLE TERMINAL DEVICE AND ON-VEHICLE DEVICE

(75) Inventor: Satoru Ushijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/662,692

(22) Filed: Apr. 28, 2010

(65) Prior Publication Data

US 2010/0216400 A1    Aug. 26, 2010

Related U.S. Application Data

(63) Continuation of application No. PCT/JP2007/073486, filed on Dec. 5, 2007.

(51) Int. Cl.
*H04B 7/00* (2006.01)

(52) U.S. Cl. .................................................. 455/41.2

(58) Field of Classification Search .............. 455/41.2, 455/41.3, 517–519
See application file for complete search history.

(56) References Cited

U.S. PATENT DOCUMENTS

| | | | |
|---|---|---|---|
| 2007/0066304 A1* | 3/2007 | Lee | 455/436 |
| 2007/0081506 A1* | 4/2007 | Yamada | 370/338 |
| 2008/0155132 A1* | 6/2008 | Kato et al. | 710/16 |

FOREIGN PATENT DOCUMENTS

| | | |
|---|---|---|
| JP | 2002-223288 | 8/2002 |
| JP | 2006-184108 | 7/2006 |
| JP | 2006-287321 | 10/2006 |
| JP | 2007-108804 | 4/2007 |
| JP | 2007-116254 | 5/2007 |

OTHER PUBLICATIONS

International Search Report for PCT/JP2007/073486, mailed Mar. 11, 2008.

* cited by examiner

*Primary Examiner* — Lewis G West
*Assistant Examiner* — David Bilodeau
(74) *Attorney, Agent, or Firm* — Staas & Halsey LLP

(57) ABSTRACT

A portable terminal device that is communicable with other devices includes a start record table, an application relation table, a device application correspondence table, an acquiring unit, and a sending unit. Upon receiving a predetermined signal from a communication device, the acquiring unit acquires first application information for specifying an application corresponding to the communication device from the device application correspondence table, and acquires, with respect to a combination of applications of which first application information is started second, second application information for specifying the first application of the combination from the application relation table. When the latest record stored in the start record table is equivalent to the second application information, the sending unit sends information representing that a priority level is high as a response to the predetermined signal that is received from the communication device.

10 Claims, 11 Drawing Sheets

CONNECTION APPLICATION
START RECORD TABLE
150b

| CONNECTION DATE | DISCONNECTION DATE | DEVICE ID | APPLICATION ID |
|---|---|---|---|
| 9/1 21:02:50 | 9/1 21:50:30 | 00:33:33:33 | 0333 |
| 9/2 20:30:15 | 9/2 21:20:20 | 00:33:33:33 | 0333 |
| 9/3 9:01:10 | 9/3 9:01:40 | 00:44:55:66 | 0456 |
| 9/3 9:05:08 | 9/3 10:15:10 | 00:55:55:77 | 0457 |
| 9/4 9:02:35 | 9/4 9:03:10 | 00:44:55:66 | 0456 |
| 9/4 9:05:45 | 9/4 9:47:55 | 00:55:55:77 | 0457 |
| 9/4 20:45:30 | 9/4 22:32:27 | 00:33:33:33 | 0333 |
| 9/5 9:00:22 | 9/5 9:00:59 | 00:44:55:66 | 0456 |
| ⋮ | ⋮ | ⋮ | ⋮ |

FIG.3

DEVICE APPLICATION CORRESPONDENCE TABLE 150a

| DEVICE ID | APPLICATION ID |
|---|---|
| 00:33:33:33 (HOME AUDIO DEVICE) | 0333 (MUSIC PLAYER APPLICATION) |
| 00:44:55:66 (HOME PC) | 0456 (DESTINATION RECEIVING APPLICATION) |
| 00:44:55:77 (ONBOARD DEVICE) | 0457 (ONBOARD APPLICATION) |

FIG.4

CONNECTION APPLICATION START RECORD TABLE 150b

| CONNECTION DATE | DISCONNECTION DATE | DEVICE ID | APPLICATION ID |
|---|---|---|---|
| 9/1 21:02:50 | 9/1 21:50:30 | 00:33:33:33 | 0333 |
| 9/2 20:30:15 | 9/2 21:20:20 | 00:33:33:33 | 0333 |
| 9/3 9:01:10 | 9/3 9:01:40 | 00:44:55:66 | 0456 |
| 9/3 9:05:08 | 9/3 10:15:10 | 00:55:55:77 | 0457 |
| 9/4 9:02:35 | 9/4 9:03:10 | 00:44:55:66 | 0456 |
| 9/4 9:05:45 | 9/4 9:47:55 | 00:55:55:77 | 0457 |
| 9/4 20:45:30 | 9/4 22:32:27 | 00:33:33:33 | 0333 |
| 9/5 9:00:22 | 9/5 9:00:59 | 00:44:55:66 | 0456 |
| ⋮ | ⋮ | ⋮ | ⋮ |

FIG.5

APPLICATION RELATION TEMPORARY TABLE 150c

| FIRST APPLICATION | SECOND APPLICATION | ITEM VALUE |
|---|---|---|
| 0456 | 0457 | 10 |
| 0333 | 0456 | 5 |
| ... | ... | ... |

FIG.6

APPLICATION RELATION TABLE 150d

| FIRST APPLICATION | SECOND APPLICATION | ITEM VALUE |
|---|---|---|
| 0456 | 0457 | 10 |
| 0333 | 0456 | 5 |
| ... | ... | ... |

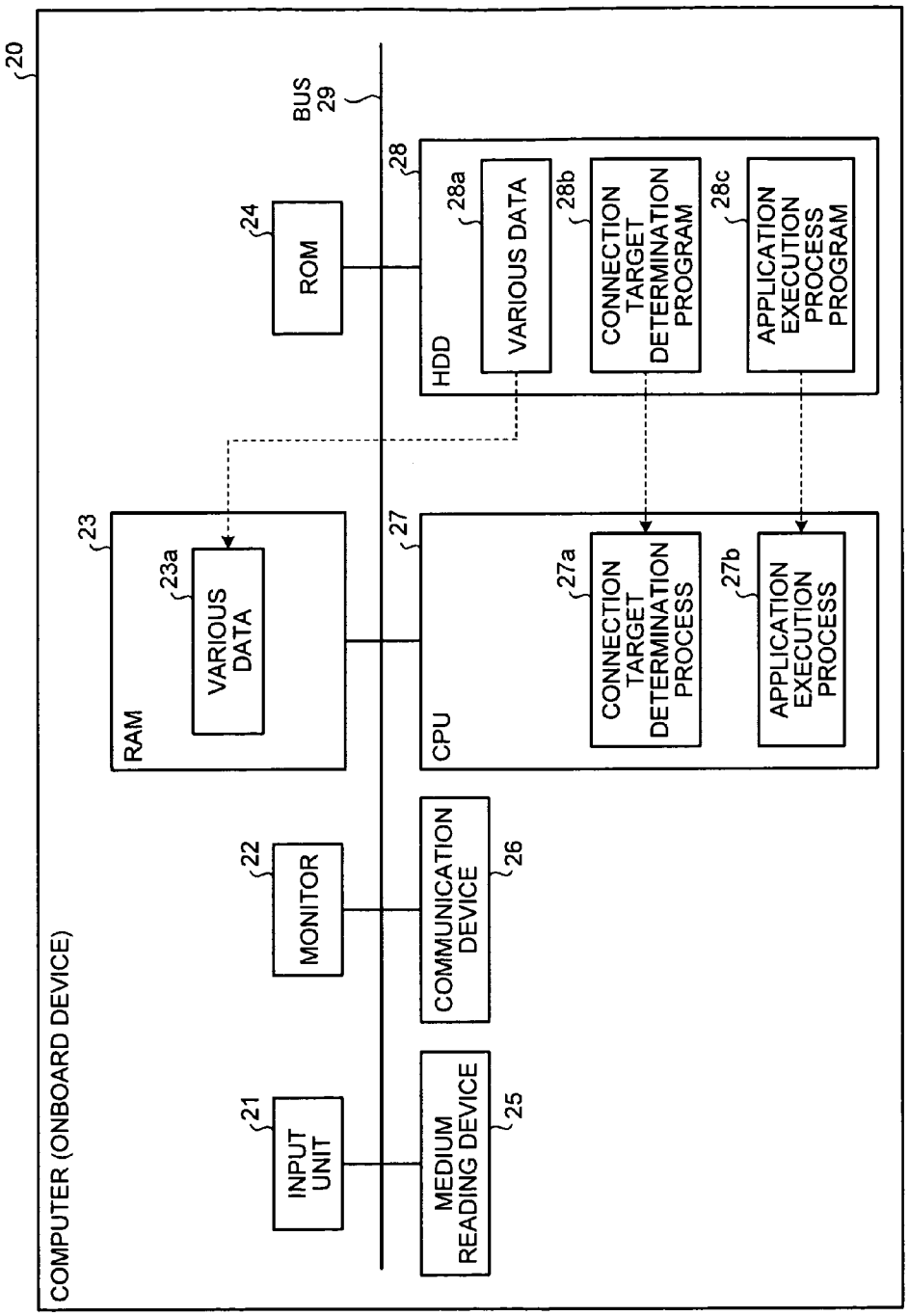

PORTABLE TERMINAL DEVICE AND ON-VEHICLE DEVICE

CROSS-REFERENCE TO RELATED APPLICATION

This application is a continuation of International Application No. PCT/JP2007/073486, filed on Dec. 5, 2007, the entire contents of which are incorporated herein by reference.

FIELD

The embodiments discussed herein are directed to a portable terminal device that may communicate with other devices and to an on-vehicle device that communicates with the portable terminal device.

BACKGROUND

Approaches have been made in recent years to connect portable terminal devices (for example, mobile phones) that are brought into vehicles and on-vehicle devices by Bluetooth® to allow cooperative operations between the applications of the portable terminal devices and the on-vehicle devices. For example, an on-vehicle application is executed using a portable terminal device to display data on the display of an on-vehicle device, operations are caused by inputting data using an on-vehicle device, such as a steering switch, and, in some work using vehicles, destination information that is transferred from an office PC to a portable terminal device is shared with an on-vehicle device in a vehicle (see, Japanese Laid-open Patent Publication No. 2006-184108).

With the above technologies, a portable terminal device, on which a necessary application is started, is brought into a vehicle in a connection-wait state, and an on-vehicle device issues a connection request to the portable terminal device that is found by device searching and, accordingly, the on-vehicle device connects to the application on the portable terminal device, which allows cooperative operations between the on-vehicle device and the portable terminal device.

In conventional technologies, if only one portable terminal device is brought into a vehicle, the on-vehicle device connects to the portable terminal device. However, if there are some portable terminal devices in a vehicle (for example, if there is a person in a passenger seat who also has a portable terminal device), the on-vehicle device may not determine by itself to which portable device the on-vehicle device may connect.

A method can be employed in which an on-vehicle device searches portable terminal devices in response to starting the vehicle engine, temporarily connects to all of the found portable terminal devices, and then sends a message to confirm whether to perform cooperative operations with the on-vehicle device to each of the portable terminal devices. A message is then displayed on the screen of each of the terminal devices to prompt users to choose whether to connect to the on-vehicle device. However, this method is not preferable because the users have to perform time-consuming operations.

In other words, it is a significant objective, even if there are a plurality of portable terminal devices that are communicable with an on-vehicle device, to connect the on-vehicle device to a portable device to which the on-vehicle device should connect without requiring the users to perform time-consuming operations.

SUMMARY

According to an aspect of an embodiment of the invention, a portable terminal device that is communicable with other devices, includes a start record table that stores start records of applications of the portable terminal device; an application relation table that stores, with respect to a combination of applications that are determined to be highly likely to be started consecutively on the basis of the start records, information for specifying each of the applications and information about in which order the applications are started; a device application correspondence table that associates and stores information for identifying a communication device with which the portable terminal device communicates and information for specifying an application to be executed when the portable terminal device connects to the communication device; an acquiring unit that, upon receiving a predetermined signal from the communication device, acquires first application information as information for specifying an application that corresponds to the communication device from the device application correspondence table, and acquires, with respect to a combination of applications of which first application information is started second, second information as information for specifying the first application of the combination from the application relation table; and a sending unit that, when the latest record that is stored in the start record table is equivalent to the second application information, sends information representing that a priority level is high as a response to the predetermined signal that is received from the communication device.

According to another aspect of an embodiment of the invention, an on-vehicle device that is communicable with a portable terminal device that is communicable with other devices, the portable terminal device includes a start record table that stores start records of applications of the portable terminal device; an application relation table that stores, with respect to a combination of applications that are determined to be highly likely to be started consecutively on the basis of the start records, information for specifying each of the applications and information about in which order the applications are started; a device application correspondence table that associates and stores information for identifying a communication device with which the portable terminal device communicates and information for specifying an application to be executed when the portable terminal device connects to the communication device; an acquiring unit that, upon receiving a predetermined signal from the communication device, acquires first application information as information for specifying an application that corresponds to the communication device from the device application correspondence table, and acquires, with respect to a combination of applications of which first application information is started second, second application information as information for specifying the first application of the combination from the application relation table; and a sending unit that, when the latest record that is stored in the start record table is equivalent to the second application information, sends information representing that a priority level is high as a response to the predetermined signal that is received from the communication device. Further, the on-vehicle device includes a determining unit that determines whether there are a plurality of the portable terminal devices that are communicable; a signal sending unit that, when the determining unit determines that there are the portable terminal devices that are communicable, sends a signal for inquiring about a priority level to each of the portable terminal devices; and a connection processing unit that receives information on the priority levels as a response to the signal and that performs a connection process with respect to any one of the portable terminal devices on the basis of the information on the priority levels.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table of an example of a device application correspondence table;

FIG. 4 is a table of an example of a connection application start record table;

FIG. 5 is a table of an example of an application relation temporary table;

FIG. 6 is a table of an example of an application relation table;

FIG. 13 is a diagram of a hardware configuration of a computer that configures the on-vehicle device according to the first embodiment.

DESCRIPTION OF EMBODIMENT(S)

Preferred embodiments of the present invention will be explained with reference to accompanying drawings. The embodiments explained below do not limit the present invention.

[a] First Embodiment

Figure 1:
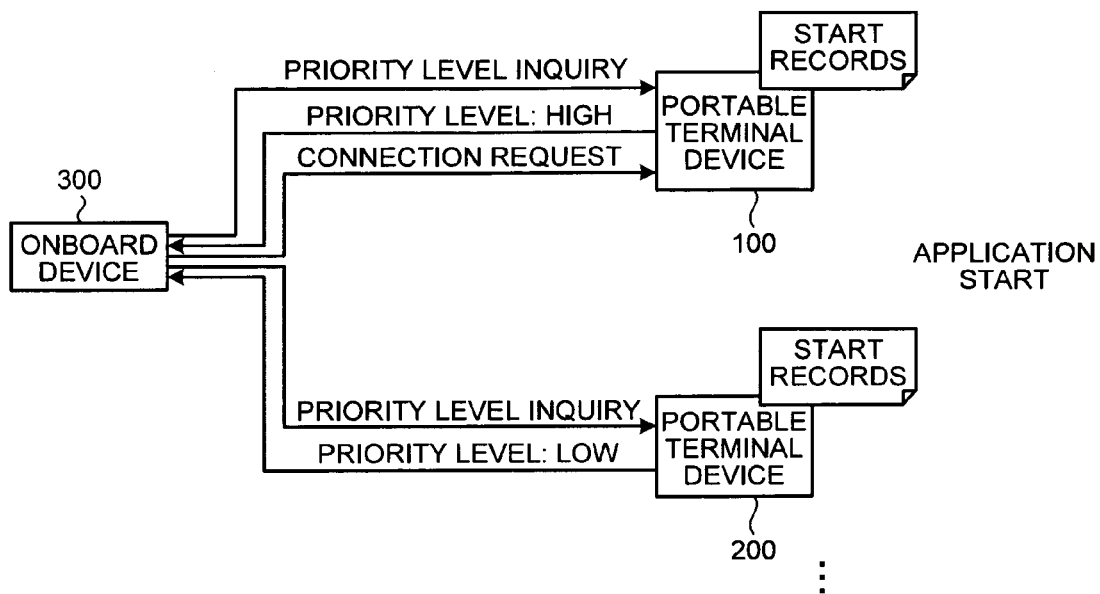
FIG. 1 is a diagram for explaining an overview and features of a portable terminal device and an on-vehicle device according to a first embodiment of the present invention.

First, an overview and features of a portable terminal device and an on-vehicle device according to a first embodiment of the present invention are explained below. FIG. 1 is a diagram for explaining the overview and features of the portable terminal device and the on-vehicle device according to the first embodiment. A case where, as represented in FIG. 1, there are a plurality of portable terminal devices that are communicable with an on-vehicle device 300 (for example, the case where there are portable terminal devices 100 and 200) is explained below.

When there are a plurality of communicable portable terminal devices, the on-vehicle device 300 makes inquiries about the priority level to each of the portable terminal devices 100 and 200 to specify a portable terminal device to which the on-vehicle device 300 is to connect.

The portable terminal devices 100 and 200 that receive the inquiries about the priority level refer to application (application program) start records, determine priority levels, and send the determination results to the on-vehicle device 300. If the portable terminal device 100 refers to the application start records and if an on-vehicle application (such as an application for connection with the on-vehicle device 300) is highly likely to be executed according to the consecutiveness in the start records, the portable terminal device 100 sends information representing that the priority level is high to the on-vehicle device 300.

For example, provided that the on-vehicle application is denoted by "A" and other applications are denoted by "B" in the start records of the portable terminal device 100, if the application start records are "B, A, B, A, B", the on-vehicle application "A" is highly likely to be performed next and thus the priority level is "high".

In contrast, if the portable terminal device 200 refers to the application start records and an application other than the on-vehicle application is highly likely to be executed next, the portable terminal device 200 sends information representing that the priority level is low to the on-vehicle device 300. For example, provided that the on-vehicle application is denoted by "A" and other applications are denoted by "B" in the application start records of the portable terminal device 200, if the application start records are "A, B, A, B, A", an application "B" other than the on-vehicle application-vehicle is highly likely to be executed and thus the priority level is "low".

The on-vehicle device 300 sends a connection request to the portable terminal device 100 having a priority level higher than that of the portable terminal device 200, on the basis of information on each priority level and accordingly the portable terminal device 100 starts the on-vehicle application.

As described above, in the first embodiment, the portable terminal devices 100 and 200 each determine a priority level from the application start records and sends the determination result to the on-vehicle device 300. Therefore, even if there are a plurality of portable terminal devices to which the on-vehicle device 300 may connect, the on-vehicle device 300 may connect to a portable terminal device to which the on-vehicle device 300 should connect without requiring the users to perform time-consuming operations.

Figure 2:
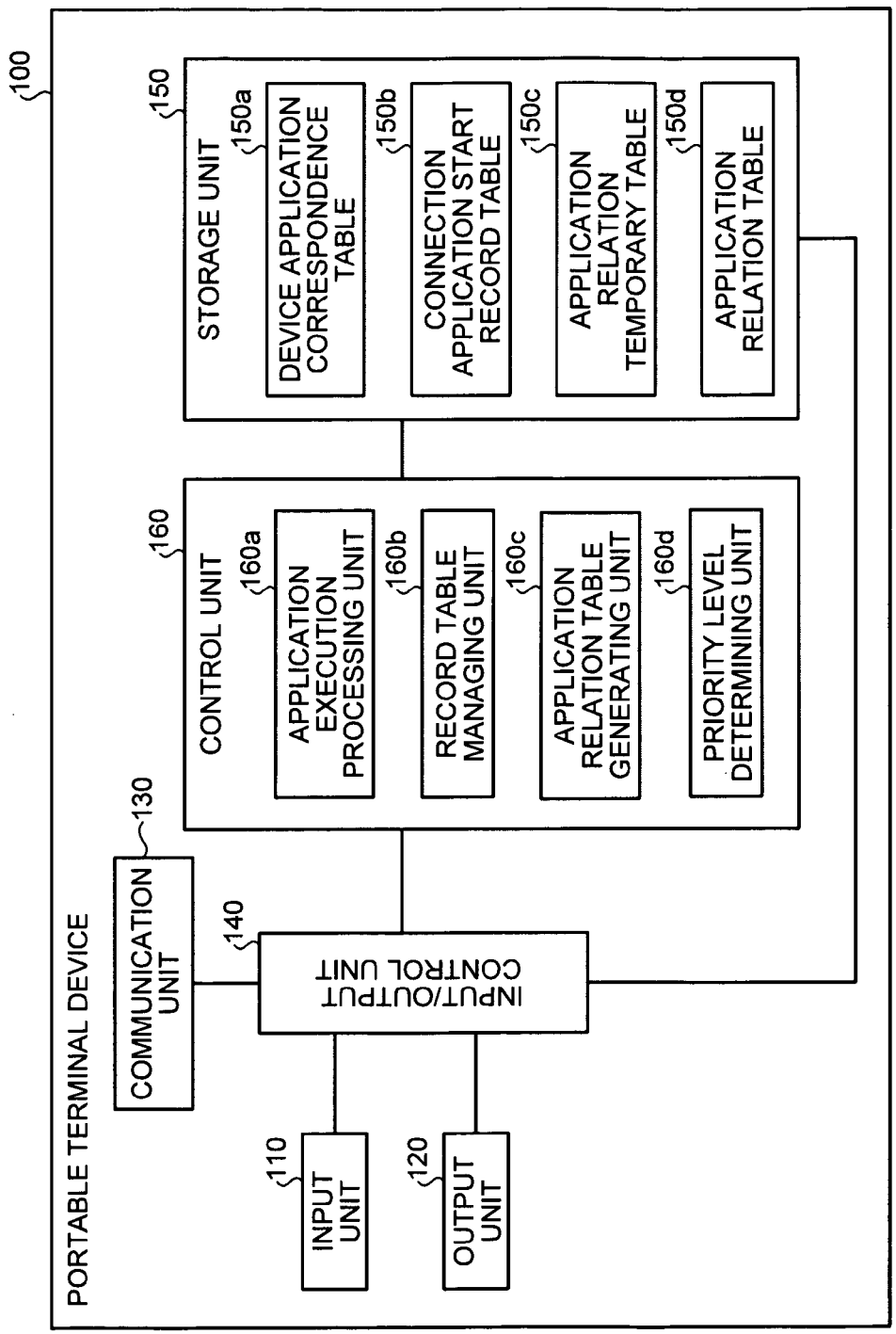
FIG. 2 is a function block diagram of a configuration of a portable terminal device according to the first embodiment.

Configurations of the portable terminal devices 100 and 200 illustrated in FIG. 1 are explained below (because the portable terminal device 100 and the portable terminal device 200 have the same configuration, only the portable terminal device 100 is explained below.) FIG. 2 is a function block diagram of a configuration of the portable terminal device 100 according to the first embodiment.

As illustrated in FIG. 2, the portable terminal device 100 includes an input unit 110, an output unit 120, a communication unit 130, an input/output control unit 140, a storage unit 150, and a control unit 160. Explanations for basic processing units that constitute known portable terminal devices (mobile phones) are omitted because the processing units are similar to those of conventional portable terminal devices.

The input unit 110 is an input unit that inputs various types of information (telephone numbers, personal information, E-Mail addresses, information for operating each application of the portable terminal device 100), and includes input keys or buttons. The output unit 120 is an output unit that outputs various types of information, and includes a display and a speaker.

The communication unit 130 is a unit that controls communications mainly with the on-vehicle device 300 (or a home audio device or a home PC). For example, the communication unit 130 communicates with the on-vehicle device 300 by Bluetooth®. The input/output control unit 140 is a unit that controls input and output of data communicated between the input unit 110, the output unit 120, the communication unit 130, the storage unit 150, and the control unit 160.

The storage unit 150 is a storage unit that stores information and programs that are necessary for various processes that are performed by the control unit 160. As depicted in FIG. 2, the storage unit 150 includes, as those closely related to the present invention, a device application correspondence table 150a, a connection application start record table 150b, an application relation temporary table 150c, and an application relation table 150d.

The device application correspondence table 150a is a table that associates and stores information (hereinafter, "device IDs") that identify other device (the home audio device, the home PC, and the on-vehicle device) that connect to the portable terminal device 100 and information (hereinafter, "application IDs") that identifies applications of the portable terminal device 100 that are executed on the device.

FIG. 3 is a table of an example of the device application correspondence table 150a. As represented in FIG. 3, the device application correspondence table 150a contains device IDs and application IDs. For example, in the device application correspondence table 150a, an application ID that corresponds to a device ID "00:33:33:33" is "0333". Thus, when the portable terminal device 100 connects to the home audio device, a music player application is started.

The connection application start record table 150b is a table that stores records of device IDs of devices that connects to each other before and application IDs that were started because of the connections. FIG. 4 is a table of an example of the connection application start record table 150b. As represented in FIG. 4, the connection application start record table 150b associates and stores connection dates, disconnection dates, device IDs, and application IDs. The portable terminal device 100 determines an application that is highly likely to be executed next according to each start record that is stored in the connection application start record table 150b.

The application relation temporary table 150c that temporarily stores combinations of applications that are highly likely to be constructively executed. FIG. 5 is a table of an example of the application relation temporary table 150c. As represented in FIG. 5, the application relation temporary table 150c contains first applications, second applications, and item values.

The relation between a first application and a second application represents that the application to be identified by the second application ID is highly likely to be executed subsequent to the application identified by the application ID of the first application. The example represented in the first column of FIG. 5 represents that the application that is highly likely to be executed subsequent to a "destination receiving application" of an application ID "456" is an "on-vehicle application" of an application ID "457". An item value is a value representing the number of times for which a combination of a first application and a second application appears in the connection application start record table 150b.

The application relation table 150d is a table that stores, out of the combinations of first applications and second applications that are stored in the application relation temporary table 150c, combinations of first applications and second applications of which item values are a predetermined value or larger. FIG. 6 is a table of an example of the application relation table 150d. As represented in FIG. 6, the application relation table 150d contains first applications, second applications, and item values. Explanations for the first applications, the second applications, and the item applications are similar to those for the first applications, the second applications, and the item applications in the application relation temporary table 150c.

Back to the explanation for FIG. 2, the control unit 160 is a control unit that includes an internal memory for storing programs that define various process procedures and control data, and performs various processes according to the programs and the control data. As illustrated in FIG. 2, the control unit 160 includes, as those closely related to the present invention, an application execution processing unit 160a, a record table managing unit 160b, an application relation table generating unit 160c, and a priority level determining unit 160d.

The application execution processing unit 160a is a unit that, upon receiving a connection request from each device (the home audio device, the home PC, or the on-vehicle device 300), executes an application (the music play application, the destination receiving application, or the on-vehicle application) corresponding to the device. For example, upon receiving a connection request from the on-vehicle device 300, the application execution processing unit 160a starts the on-vehicle application, starts data communications with the on-vehicle device 300, and sends, to the on-vehicle device 300, destination information that is previously received from the home PC and stored by the portable terminal device 100 using the destination receiving application. The application execution processing unit 160a disconnects and stop communications after the data communications completes.

The record table managing unit 160b is a unit that manages the connection application start record table 150b. Specifically, the record table managing unit 160b monitors the application execution processing unit 160a, and registers start records (a connection date, a disconnection date, a device ID, and an application ID) in the connection application start record table 150b each time the application execution processing unit 160a performs connection or disconnection with a device.

The application relation table generating unit 160c is a unit that generates the application relation temporary table 150c on the basis of the connection application start record table 150b, and that generates the application relation table 150d by extracting, from combinations of first applications and second applications, combinations each having an item value that is the predetermined value or larger.

When the application relation table generating unit 160c generates the application relation temporary table 150c on the basis of the connection application start record table 150b, the application relation table generating unit 160c extracts a combination of consecutive applications in the connection application start record table 150b as a first application and a second application, and generates the application relation temporary table 150c by counting, as an item value, the number of times for which the combination is contained in the connection application start record table 150b.

When extracting a combination of a first application and a second application that are consecutive, the application relation table generating unit 160c extracts, as a combination of a first application and a second application, a combination of applications with the time difference between the connection date (or the disconnection date) of the application corresponding to a first application and the connection date (or the disconnection date) of an application corresponding to a second application, which time difference is a predetermined value or smaller.

Upon receiving a priority level inquiry from the on-vehicle device 300, the priority level determining unit 160d determines a priority level on the basis of the application relation table 150d and sends information on the determined priority level to the on-vehicle device 300.

Specifically, upon receiving a priority level inquiry (including the device ID of the on-vehicle device 300) from the on-vehicle device 300, the priority level determining unit 160d compares the device ID of the on-vehicle device 300 "00:33:33:33" with the device application correspondence table 150a to specify the corresponding application ID "0457".

The priority level determining unit 160d compares the device application correspondence table 150a with the device ID "00:33:33:33" of the on-vehicle device 300. When the device ID "00:33:33:33" is not in the device application correspondence table 150a, the priority level determining unit 160d determines the priority level "low" and sends information on the priority level "low" to the on-vehicle device 300.

The priority level determining unit 160d also compares the application ID "0457" corresponding to the on-vehicle device 300 with the second applications of the application relation table 150d to determine whether there is the application ID "0457" in the second applications. When the application ID "0457" is not in the second applications, the priority level determining unit 160d determines the priority level "low" and sends information on the priority level to the on-vehicle device 300.

When the priority level is not "low", the priority level determining unit 160d determines whether the last item (the latest start record) in the connection application start record table 150b corresponds to the first application and the present time is within N minutes from the start time of the first application (the connection date or the disconnection date).

When the last item (the latest start record) in the connection application start record table 150b corresponds to the first application and the present time is within N minutes from the start time of the first application (the connection date or the disconnection date), the priority level determining unit 160d determines the priority level "high" and sends information on the priority level "high" to the on-vehicle device 300.

In contrast, when the last item (the latest start record) in the connection application start record table 150b does not correspond to the first application, or when the present time is after N minutes from the start time of the first application (the connection date or the disconnection date), the priority level determining unit 160d determines the priority level "middle" and sends information on the priority level "middle" to the on-vehicle device 300.

The processes of the priority level determining unit 160d are explained below taking as an example the device application correspondence table 150a (FIG. 3), the connection application start record table 150b (FIG. 4), the application relation table 150d (FIG. 6).

The priority level determining unit 160d compares the device ID "00:33:33:33" with the device application correspondence table 150a. Because the device ID "00:33:33:33" is in the device application correspondence table 150a, the priority level determining unit 160d does not determine the priority level "low" at this stage.

The priority level determining unit 160d compares the application ID "0457" of the application ID corresponding to the on-vehicle device 300 with the second applications of the application relation table 150d to determine whether there is the application ID "0457" in the second applications. Because the application ID "0457" is in the second applications, the priority level determining unit 160d determines the priority level as a priority level other than "low" (the priority level "middle" or the priority level "high").

The priority level determining unit 160d determines whether the last item (the latest start record) in the connection application start record table 150b corresponds to the first application. The last item corresponds to the first application "0456" in the application relation table 150d. When the present time is within N minutes from the start time (the connection date or the disconnection date) of the first application "0456", the priority level determining unit 160d determines the priority level "high" and sends information on the priority level "high" to the on-vehicle device 300.

Figure 7:
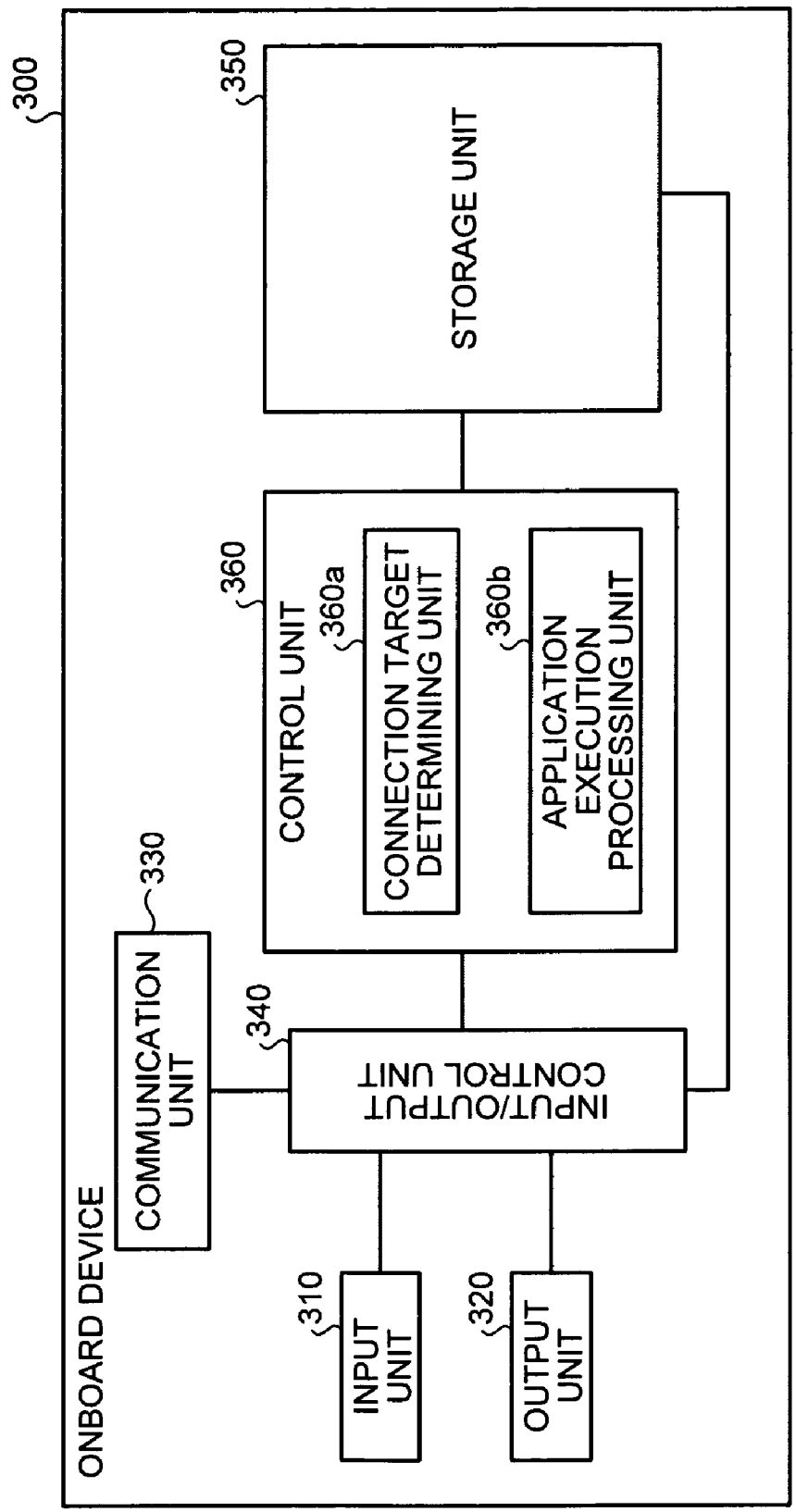
FIG. 7 is a function block diagram of a configuration of the on-vehicle device according to the first embodiment.

A configuration of the on-vehicle device 300 illustrated in FIG. 1 is explained below. FIG. 7 is a function block diagram of the configuration of the on-vehicle device 300 according to the first embodiment. As illustrated in FIG. 7, the on-vehicle device 300 includes an input unit 310, an output unit 320, a communication unit 330, an input/output control unit 340, a storage unit 350, and a control unit 360. Explanations for basic processing units that constitute known on-vehicle devices (such as car navigation systems) are omitted because they are similar to those of known car navigation systems.

The input unit 310 is an input unit that inputs various types of information (such as destination information), and includes input keys or buttons. The output unit 320 is an output unit that outputs various types of information, and includes a display and a speaker.

The communication unit 330 is a unit that controls communications with the portable terminal device 100 or the portable terminal device 200. For example, the communication unit 130 communicates with the portable terminal devices 100 and 200 by Bluetooth®. The input/output control unit 340 is a unit that controls input and output of data communicated between the input unit 310, the output unit 320, the communication unit 330, the storage unit 350, and the control unit 360.

The storage unit 350 is a storage unit that stores information and programs that are necessary for various processes that are performed by the control unit 360, and stores, for example, map information (not illustrated) and information on a destination (not illustrated) that is set by the user.

The control unit 360 includes an internal memory for storing programs that define various process procedures and control data and performs the various processes according to the programs and the control data. Specifically, as illustrated in FIG. 7, the control unit 360 includes a connection target determining unit 360a and an application execution processing unit 360b as those closely related to the present invention.

The connection target determining unit 360a is a unit that determines a portable terminal device to which the on-vehicle device 300 connects. Specifically, the connection target determining unit 360a sends a priority level inquiry to communicable portable terminal devices and acquires information on the priority level from each portable terminal device. The connection target determining unit 360a compares the acquired priority level information to determine a portable terminal device with the highest priority level as a portable terminal device to which the on-vehicle device 300 connects, and issue a connection request to the determined portable terminal device.

For example, when the connection target determining unit 360a sends priority level inquiries to the communicable portable terminal devices 100 and 200 and acquires a priority level "high" from the portable terminal device 100 and a priority level "low" from the portable terminal device 200, the connection target determining unit 360a issues a connection request to the portable terminal device 100 with the high priority level.

The application execution processing unit 360*b* is a processing unit that performs various processes in cooperation with the on-vehicle application in the portable terminal device to which the on-vehicle device 300 connects. For example, the application execution processing unit 360*b* acquires destination information from the on-vehicle application of the portable terminal device, searches a route from the present location to the destination according to the map information, and outputs the search result to the output unit 320.

Figure 8:
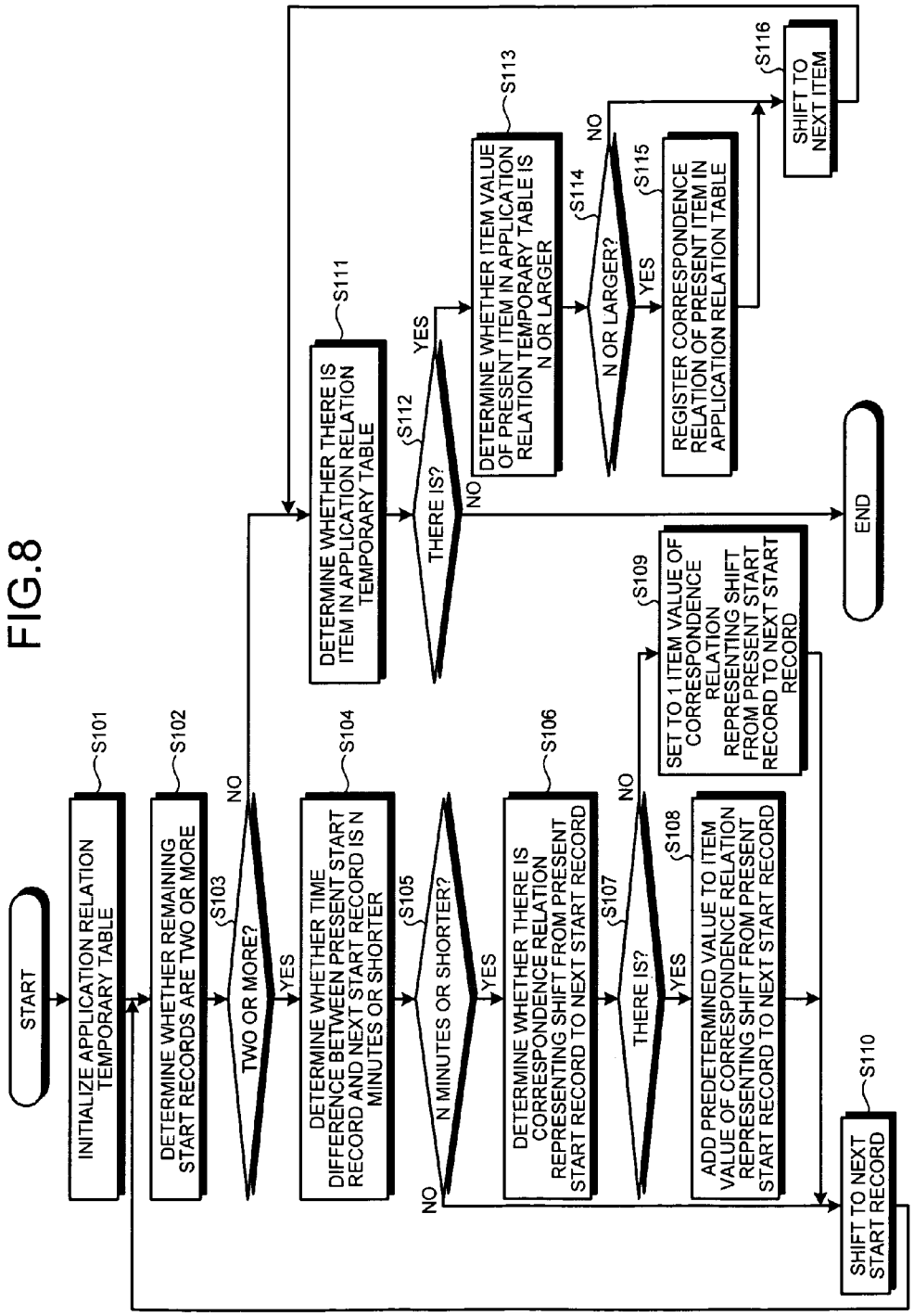
FIG. 8 is a flowchart of a process procedure of an application relation table generation process.

Each process that is performed by the portable terminal device 100 is sequentially explained below. FIG. 8 is a flowchart of a process procedure of an application relation table generation process. As represented in FIG. 8, the application relation table generating unit 160*c* initializes the application relation temporary table 150*c* (step S101) and determines whether remaining start records in the connection application start record table 150*b* are two or more (step S102).

When the remaining start records are two or more (YES at step S103), the application relation table generating unit 160*c* determines whether the time difference between the present start record and the next start record is N minutes or shorter (step S104). When the time difference is not N minutes or shorter (NO at step S105), the application relation table generating unit 160*c* goes to step S110.

In contrast, when the time difference is N minutes or shorter (YES at step S105), the application relation table generating unit 160*c* determines whether there is a correspondence relation representing shift from the present start record to the next start record (the relation between the first application and the second application) is in the application relation temporary table 150*c* (step S106). When there is the correspondence relation in the application relation temporary table 150*c* (YES at step S107), the application relation table generating unit 160*c* adds a predetermined value to the item value of the correspondence relation representing the shift from the present start record to the next start record (the correspondence relation representing that the present start record is of the first application and the next start record is of the second application) (step S108), and the application relation table generating unit 160*c* goes to step S110.

In contrast, when there is not the correspondence relation in the application relation temporary table 150*c* (No at step S107), the application relation table generating unit 160*c* sets to 1 the item value of the correspondence relation representing the shift from the present start record to the next start record (the correspondence relation representing that the present start record is of the fist application and the next start record is of the second application) (step S109), the application relation table generating unit 160*c* shifts to the next start record (step S110) and goes to step S110.

At step S103, when the remaining start records are less than two (NO at step S103), the application relation table generating unit 160*c* determines whether there are items in the application relation temporary table 150*c* (step S111). When there are no items in the application relation temporary table 150*c* (NO at step S112), the application relation table generating unit 160*c* completes the process.

In contrast, when there are items in the application relation temporary table 150*c* (YES at step S112), it is determined whether the item value of the present item in the application relation temporary table is N or larger (N is an integer not less than 1) (step S113).

When the item value of the present item is N or larger (YES at step S114), the application relation table generating unit 160*c* registers a correspondence relation of the present item (a first application, a second application, and an item value) in the application relation table 150*d* (step S115) and shifts to the next item (step S116) and goes to step S111. In contrast, when the item value of the present item is smaller than N (NO at step S114), the application relation table generating unit 160*c* directly goes to step S116.

Figure 9:
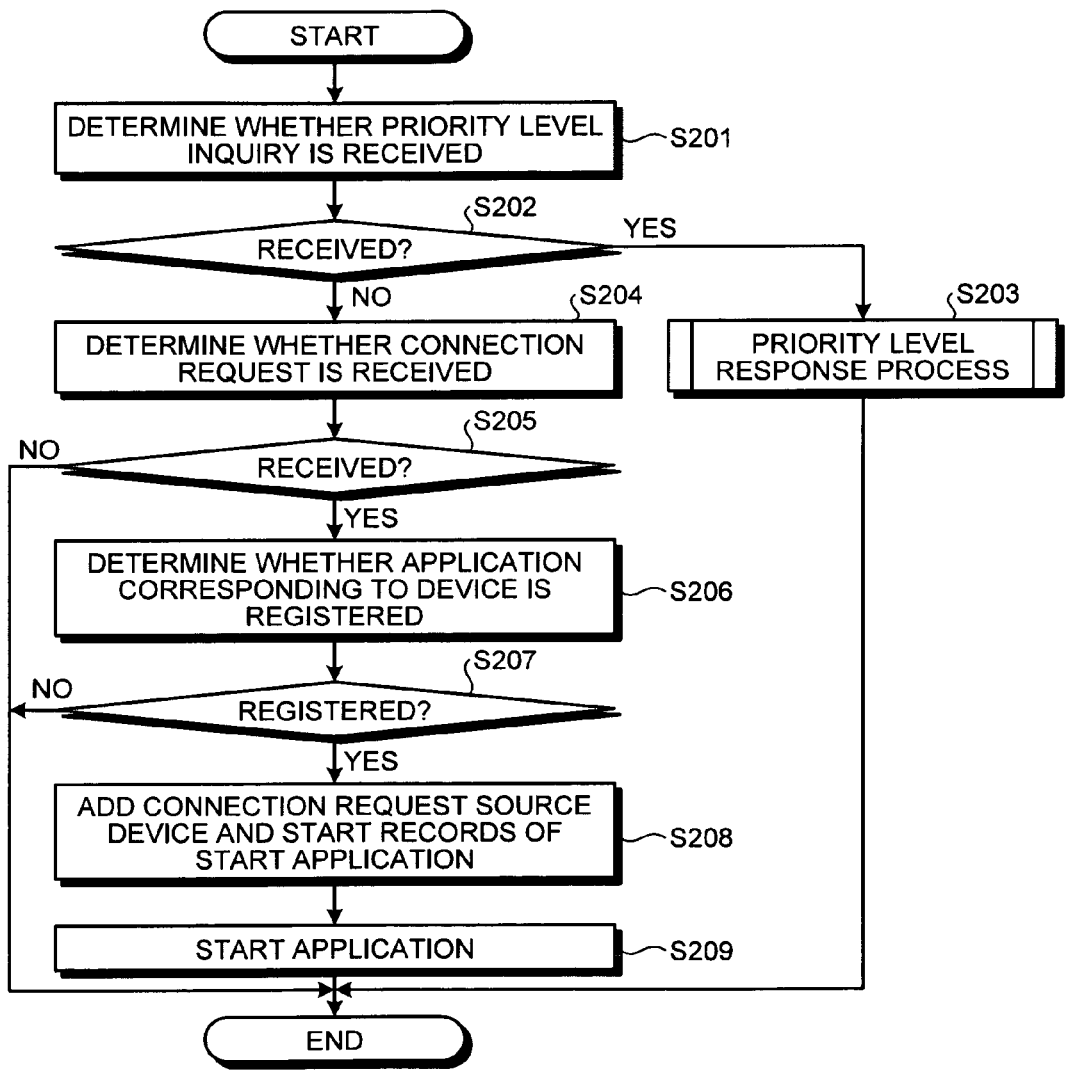
FIG. 9 is a flowchart of a process procedure of a response process.

A priority level determination process that is performed by the priority level determining unit 160*d* is explained below. FIG. 9 is a flowchart of a process procedure of a response process. As illustrated in FIG. 9, the portable terminal device 100 determines whether a priority level inquiry is received (step S201). When a priority level inquiry is received (YES at step S202), the portable terminal device 100 performs the priority level response process (step S203) and completes the process.

In contrast, when no priority level inquiry is received (NO at step S202), the portable terminal device 100 determines whether a connection request is received (step S204). When no connection request is received (NO at step S205), the portable terminal device 100 completes the process.

In contrast, when a connection request is received (step S205), the portable terminal device 100 determines whether an application that corresponds to the device (for example, the on-vehicle device 300) is registered (step S206). When the application is not registered (NO at step S207), the portable terminal device 100 completes the process.

In contrast, when the application corresponding to the device is registered (YES at step S207), the portable terminal device 100 adds a connection request source device and the start record of the start application to the connection application start record table 150*b* (step S208) and starts the application (step S209).

Figure 10:
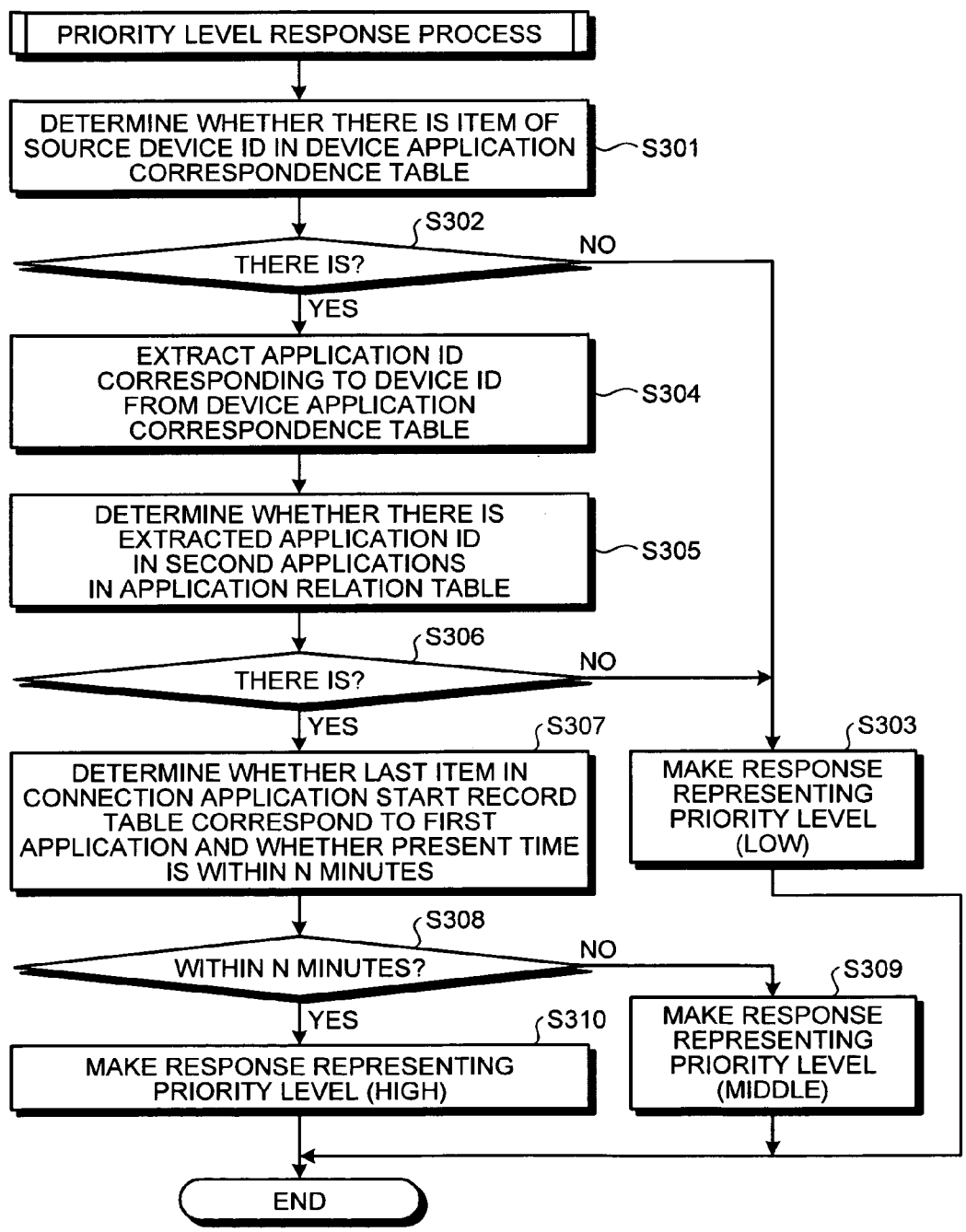
FIG. 10 is a flowchart of a process procedure of a priority level response process.

The priority level response process represented at step S203 in FIG. 9 is explained below. FIG. 10 is a flowchart of the priority level response process. As represented in FIG. 10, the priority level determining unit 160*d* determines whether there is an item of the device ID of the source device (the device ID of the on-vehicle device 300) in the device application correspondence table 150*a* (step S301). When the there is not the item (NO at step S302), the priority level determining unit 160*d* makes a response representing a priority level "low" (step S303).

In contrast, when there is the device ID of the source device (YES at step S302), the priority level determining unit 160*d* extracts an application ID that corresponds to the device ID from the device application correspondence table 150*a* (step S304) and determines whether there is the extracted application ID in the second applications in the application relation table 150*d* (step S305).

When there is not the extracted application ID in the second applications in the application relation table 150*d* (NO at step S306), the priority level determining unit 160*d* goes to step S303. In contrast, when there is the extracted application ID in the application relation table 150*d* (YES at step S306), the priority level determining unit 160*d* determines whether the last item in the connection application start record table 150*b* corresponds to the first application and whether the present time is within N minutes (step S307).

When the conditions at step S307 are not satisfied (NO at step S308), the priority level determining unit 160*d* makes a response representing a priority level "middle" (step S309). In contrast, when the conditions at step S307 are satisfied (YES at step S308), the priority level determining unit 160*d* makes a response representing a priority level "high" (step S310).

As described above, when a priority level inquiry is received, the priority level determining unit 160*d* of the portable terminal device 100 refers to the tables 150*a* to 150*d* that are stored in the storage unit 150, determines a priority level, and makes a response representing information on the priority level to the on-vehicle device 300. This allows the on-vehicle device 300 to determine a connection target without excessive loads on the on-vehicle device 300.

Figure 11:
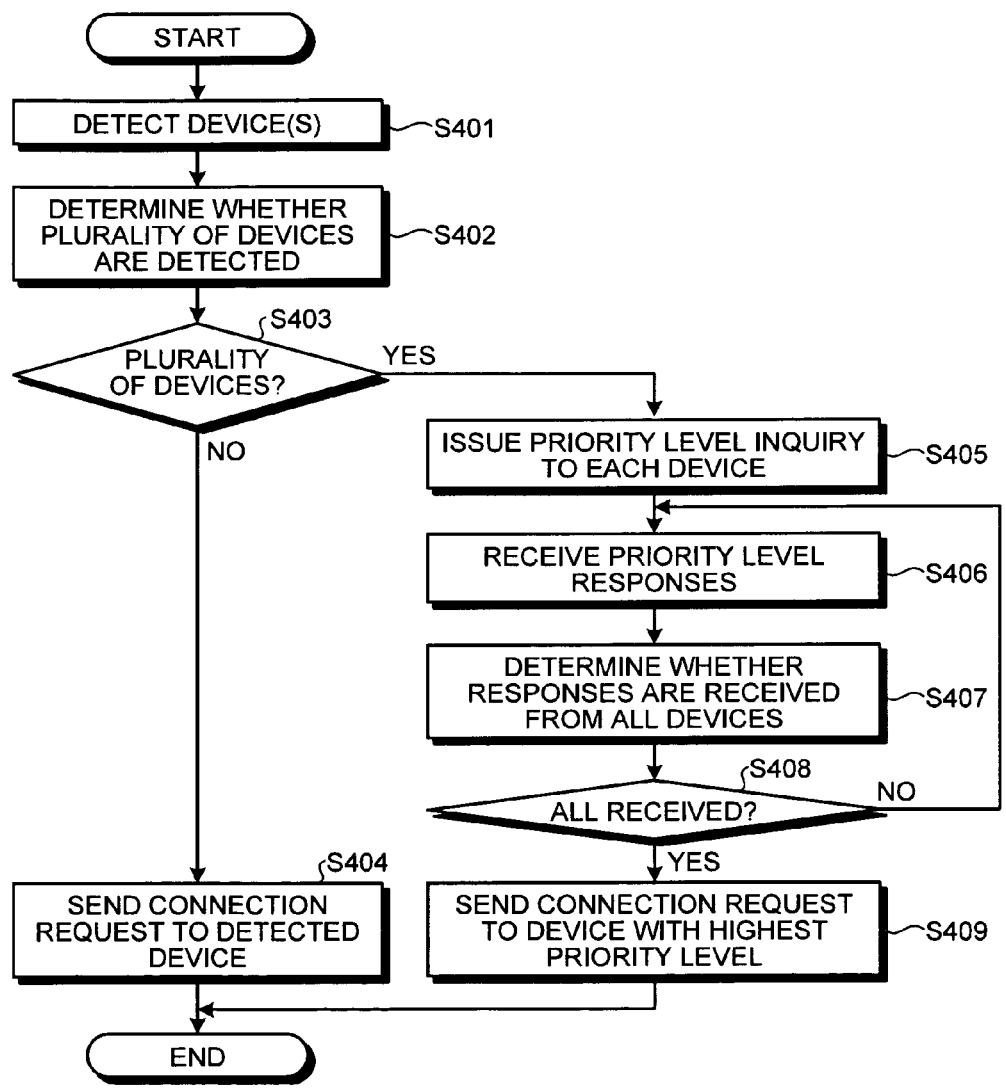
FIG. 11 is a flowchart of a process procedure of a connection request process.

A connection request process of the on-vehicle device 300 is explained below. FIG. 11 is a flowchart of a process procedure of the connection request process. As illustrated in FIG. 11, the on-vehicle device 300 detects a device(s) (portable terminal device (s)) (step S401), and determines whether a plurality of devices are detected (step S402).

When only one device is detected (No at step S403), the on-vehicle device 300 sends a connection request to the detected device (step S404). In contrast, when a plurality of devices are detected, the on-vehicle device 300 issues a priority level inquiry to each of the devices (step S405).

The on-vehicle device 300 then receives responses representing priority levels (step S406), and determines whether it receives responses from all of the devices (step S407). When the on-vehicle device 300 receives responses from not all of the devices (NO at step S408), the on-vehicle device 300 goes to step S406. In contrast, when the on-vehicle device 300 receives responses from all of the devices (YES at step S408), the on-vehicle device 300 sends a connection request to a device with the highest priority level (step S409).

As described above, when the on-vehicle device 300 is communicable with a plurality of devices (portable terminal devices), the on-vehicle device 300 makes an inquiry about the priority level to each device and determines a connection target on the basis of the response information about the priority levels. Therefore, the on-vehicle device 300 can start data communications with an application of a device to which the on-vehicle device 300 should connect without requiring users to perform time-consuming operations.

As described above, the portable terminal device 100 according the first embodiment stores the tables 150a to 150d in the storage unit 150. Upon receiving a predetermined signal from the on-vehicle device 300, the portable terminal device 100 acquires first application information (the on-vehicle application) as information for specifying the application corresponding to the on-vehicle device 300. The portable terminal device 100 also acquires, with respect to a combination of applications of which first application information is to be executed second, second application information as information for specifying the first application of the combination from the application relation table 150d. When the latest record that is stored in the connection application start record table 150b is equivalent to the second application information, the portable terminal device 100 sends information representing that the priority level is high as a response to a predetermined signal that is received from the device with which the portable terminal device 100 communicates. Therefore, even if there are a plurality of portable terminal devices that are communicable with the on-vehicle device 300, the on-vehicle device may connect to a portable terminal device to which the on-vehicle device should connect without requiring users to perform time-consuming operations.

[b] Second Embodiment

The first embodiment of the present invention is explained above. The present invention may be carried out in various modes in addition to the first embodiment. Other embodiments according to the present invention are explained below as a second embodiment.

(1) Method of Specifying Application ID of Portable Terminal Device

In the first embodiment, for example, the device application correspondence table 150a is used that associates the application IDs of the portable terminal device 100 and the device IDs of other devices. By comparing a device ID that is sent together with a priority level inquiry with the device application correspondence table 150a, the corresponding application ID of the portable terminal device 100 is specified. However, the present invention is not limited to this.

Alternatively, for example, a device application correspondence table that associates other-device application IDs that identify applications of other devices and the application IDs of the portable terminal device 100 may be used to specify a corresponding application ID of the portable terminal device 100. In this case, when one of other devices (such as the on-vehicle device) that issue priority level inquiries issues a priority level inquiry, the device sends information of its other-device application ID to the portable terminal device 100.

By specifying an application ID of the portable terminal device 100 from the other-device application ID of one of other devices, it may be prevented that a plurality of application IDs hit with respect to one single device ID. Accordingly, a priority level may be efficiently determined.

(2) Information on Priority Level as a Response to On-vehicle Device

In the first embodiment, for example, the priority level determining unit 160d determines a priority level to any one of "low", "middle", and "high" on the basis of the tables 150a to 150d that are stored in the storage unit 150 and sends information on the priority level to the on-vehicle device 300. However, the present invention is not limited to this.

For example, the priority level determining unit 160d may send, instead of a priority level, an item value corresponding to a combination of a first application and a second application to the on-vehicle device 300. Explanation for this is explained below with reference to the application relation table 150d depicted in FIG. 6. Upon receiving a priority level inquiry from a device corresponding to the second application "0457", and if the latest record in the connection application start record table 150b is the first application "0456", the priority level determining unit 160d sends the item value "10" to the on-vehicle device 300. When the on-vehicle device 300 receives item values as the priority level information from portable terminal devices respectively, the on-vehicle device 300 compares the item values and sends a connection request to a portable terminal device with the largest item value.

As described above, because the portable terminal device sends an item value as priority level information to the on-vehicle device 300, it may be prevented that the priority levels of a plurality of portable terminal devices are the same (for example, the priority levels of a plurality of portable terminal devices are all "high").

(3) System Configuration

Among the processes explained in the embodiments, the processes that are explained as those automatically performed may be entirely or partially performed manually and the processes that are explained as those manually performed may be entirely or partially performed automatically using known methods. In addition, the process procedures, control procedures, specific names, information including various types of data and parameters, which are illustrated in the specification and the drawings, may be changed arbitrarily unless otherwise noted.

The elements of the portable terminal device 100 illustrated in FIG. 2 and of the on-vehicle device 300 illustrated in FIG. 7 are a functional concept and thus are not required to be physically configured as represented in the drawings. In other words, specific modes of dispersion or integration of the devices are not limited to those illustrated in the drawings. The devices may be configured in a way that they are entirely or partially dispersed or integrated functionally or physically on an arbitrary basis according to various loads or use. Furthermore, each process function performed by each device may be entirely or arbitrarily partially implemented by a CPU and programs that are analyzed and executed by the CPU, or may be implemented as wired logic hardware.

Figure 12:
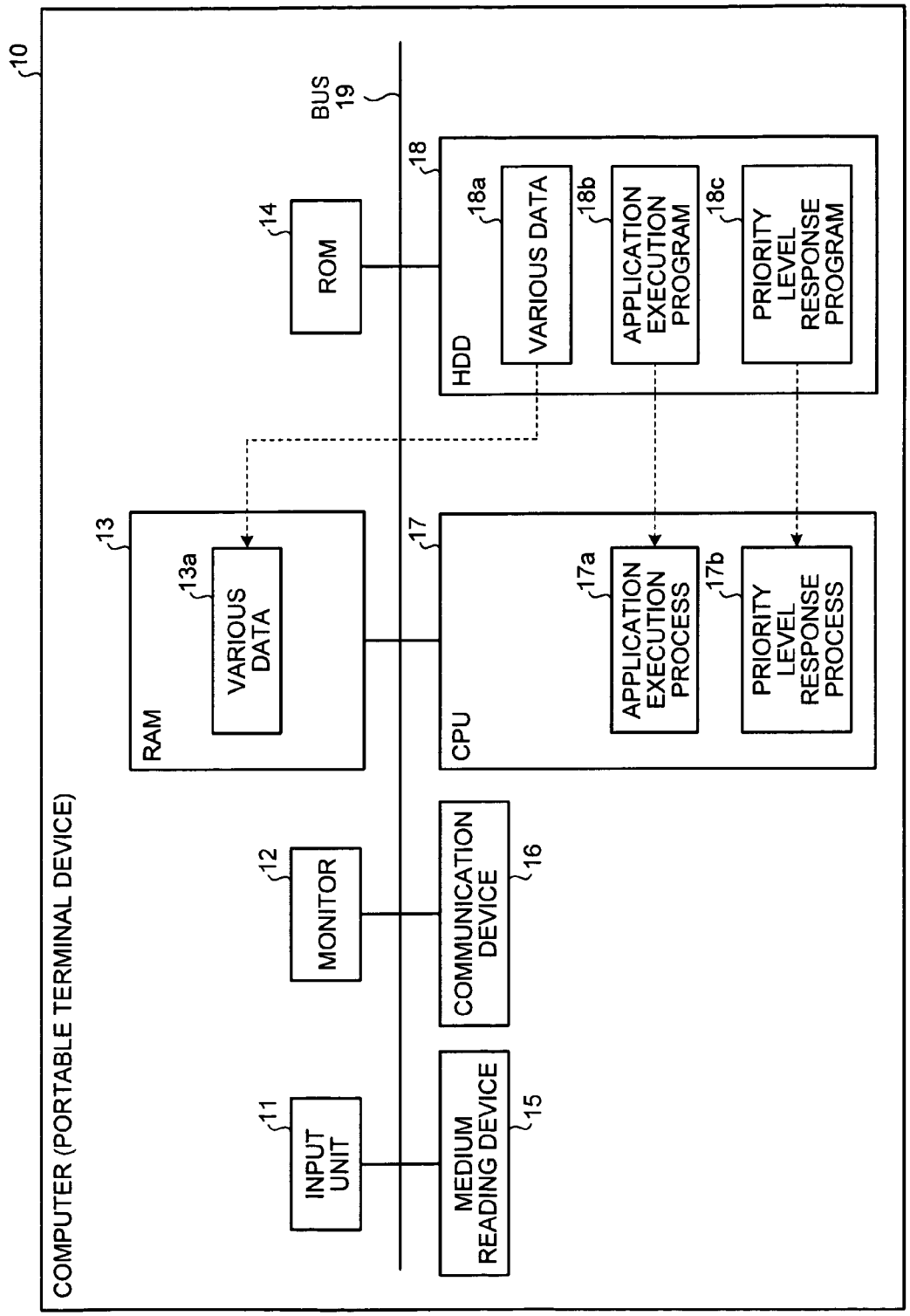
FIG. 12 is a diagram of a hardware configuration of a computer that configures the portable terminal device according to the first embodiment.

FIG. 12 is a diagram of a hardware configuration of a computer that configures the portable terminal device 100 according to the first embodiment. As illustrated in FIG. 12, a computer (a portable terminal device) 10 is configured by connecting, via a bus 19, an input unit 11, a monitor 12, a random access memory (RAM) 13, a read only memory (ROM) 14, a medium reading device 15 that reads data from a storage medium, a communication device 16 that communicates data with other devices (including the on-vehicle device 300), a central processing unit (CPU) 17, and a hard disk drive (HDD) 18.

The HDD 18 stores an application execution program 18b and a priority level response program 18c that implement similar functions as those of the portable terminal device 100. The CPU 17 reads the application execution program 18b and the priority level response program 18c and executes the programs to start an application execution process 17a and a priority level response process 17b. The application execution process 17a corresponds to the application execution processing unit 160a represented in FIG. 2 and the priority level response process 17b corresponds to the record table managing unit 160b, the application relation table generating unit 160c, and the priority level determining unit 160d that are represented in FIG. 2.

The HDD 18 stores various data 18a that corresponds to the tables 150a to 150d in the storage unit 150. The CPU 17 reads the various data 18a that is stored in the HDD 18, stores the data in the RAM 13, determines a priority level using various data 13a stored in the RAM 13, and sends information on the priority level, which is the determination result, to the on-vehicle device 300.

FIG. 13 is a diagram of a hardware configuration of a computer that configures the on-vehicle device 300 according to the first embodiment. As illustrated in FIG. 13, a computer (on-vehicle device) 20 is configured by connecting, via a bus 29, an input unit 21, a monitor 22, a RAM 23, a ROM 24, a medium reading device 25 that reads data from a storage medium, a communication device 26 that communicates data with other devices (including the portable terminal devices 100 and 200), a CPU 27, and an HDD 28.

The HDD 28 stores a connection target determination program 28b and an application execution process program 28c that implement similar functions as those of the on-vehicle device 300. The CPU 27 reads the connection target determination program 28b and the application execution process program 28c and executes the programs to start a connection target determination process 27a and an application execution process 27b. The connection target determination process 27a corresponds to the connection target determining unit 360a represented in FIG. 7, and the application execution process 27b corresponds to the application execution processing unit 360b represented in FIG. 7.

The HDD 28 stores various data 28a that corresponds to the various types of data stored in the storage unit 350. The CPU 27 reads the various data 28a that is stored in the HDD 28, stores the data in the RAM 23, and determines a connection target using various data 23a stored in the RAM 23.

The application execution program 18b, the priority level response program 18c, the connection target determination program 28b, and the application execution process program 28c that are represented in FIG. 12 and FIG. 13 are not necessarily stored in the HDD 18 and the HDD 28 previously. For example, the application execution program 18b, the priority level response program 18c, the connection target determination program 28b, and the application execution process program 28c may be stored in "a portable physical medium" that is inserted to the computer, such as a flexible disk (FD), a CD-ROM, a DVD disk, a magneto-optical disk, or an IC card, "a fixed physical medium" that is provided in or outside the computer, such as a hard disk drive (HDD), or "another computer (or server)" that is connected to the computer via, for example, public lines, the Internet, a LAN, or a WAN, such that the computer can read the application execution program 18b, the priority level response program 18c, the connection target determination program 28b, and the application execution process program 28c from the medium or computer and executes the programs.

According to the embodiments, the portable terminal device determines information on priority levels more accurately.

According to the embodiments, the portable terminal device registers combinations of applications that are highly likely to be executed consecutively in the application relation table more accurately.

According to the embodiments, even if there are a plurality of portable terminal devices that are communicable with an on-vehicle device, the on-vehicle device may connect to a portable terminal device to which the on-vehicle device should connect without requiring the users to perform time-consuming operations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable terminal device that is communicable with other devices, the portable terminal device comprising:
   a start record table that stores start records of applications of the portable terminal device;
   an application relation table that stores, with respect to a combination of applications that are determined to be highly likely to be started consecutively on the basis of the start records, information for specifying each of the applications and information about in which order the applications are started;
   a device application correspondence table that associates and stores information for identifying a communication device with which the portable terminal device communicates and information for specifying an application to be executed when the portable terminal device connects to the communication device;

an acquiring unit that, upon receiving a predetermined signal from the communication device, acquires first application information as information for specifying an application that corresponds to the communication device from the device application correspondence table, and acquires, with respect to a combination of applications of which first application information is started second, second application information as information for specifying the first application of the combination from the application relation table; and a sending unit that, when the latest record that is stored in the start record table is equivalent to the second application information, sends information representing that a priority level is high as a response to the predetermined signal that is received from the communication device.

2. The portable terminal device according to claim 1, wherein, when the latest record that is stored in the start record table differs from the second application information, the sending unit sends information representing that the priority level is low as the response to the predetermined signal that is received from the communication device.

3. The portable terminal device according to claim 1, further comprising an application relation table generating unit that extracts a combination of applications that are started consecutively on the basis of each consecutive record that is stored in the start record table, and that generates the application relation table on the basis of the number of times for which the extracted combination is contained in the start records.

4. The portable terminal device according to claim 3, wherein the application relation table generating unit determines, out of combinations of applications that are started consecutively, a combination of applications with a difference between times at which the applications are started, which difference is a predetermined time or shorter, as a combination of applications that is to be registered in the application relation table.

5. An on-vehicle device that is communicable with a portable terminal device that is communicable with other devices, the portable terminal device including a start record table that stores start records of applications of the portable terminal device;

an application relation table that stores, with respect to a combination of applications that are determined to be highly likely to be started consecutively on the basis of the start records, information for specifying each of the applications and information about in which order the applications are started;

a device application correspondence table that associates and stores information for identifying a communication device with which the portable terminal device communicates and information for specifying an application to be executed when the portable terminal device connects to the communication device;

an acquiring unit that, upon receiving a predetermined signal from the communication device, acquires first application information as information for specifying an application that corresponds to the communication device from the device application correspondence table, and acquires, with respect to a combination of applications of which first application information is started second, second application information as information for specifying the first application of the combination from the application relation table; and a sending unit that, when the latest record that is stored in the start record table is equivalent to the second application information, sends information representing that a priority level is high as a response to the predetermined signal that is received from the communication device, and the on-vehicle device comprising:

a determining unit that determines whether there are a plurality of the portable terminal devices that are communicable;

a signal sending unit that, when the determining unit determines that there are the portable terminal devices that are communicable, sends a signal for inquiring about a priority level to each of the portable terminal devices; and a connection processing unit that receives information on the priority levels as a response to the signal and that performs a connection process with respect to any one of the portable terminal devices on the basis of the information on the priority levels.

6. The on-vehicle device according to claim 5, wherein the connection processing unit performs the connection process with respect to a portable terminal device that makes a response representing the highest priority level out of the information on the priority levels.

7. A computer-readable storage medium that stores a program causing a computer to execute a process for sending a priority level of a portable terminal device that is communicable with other devices, the computer including a start record table that stores start records of applications of the portable terminal device;

an application relation table that stores, with respect to a combination of applications that are determined to be highly likely to be started consecutively on the basis of the start records, information for specifying each of the applications and information about in which order the applications are started; and a device application correspondence table that associates and stores information for identifying a communication device with which the portable terminal device communicates and information for specifying an application to be executed when the portable terminal device connects to the communication device, the program causing the computer to execute the process comprising:

acquiring, upon receiving a predetermined signal from the communication device, first application information as information for specifying an application that corresponds to the communication device from the device application correspondence table, and acquiring, with respect to a combination of applications of which first application information is started second, second application information as information for specifying the first application of the combination from the application relation table; and sending, when the latest record that is stored in the start record table is equivalent to the second application information, information representing that a priority level is high as a response to the predetermined signal that is received from the communication device.

8. The computer-readable storage medium according to claim 7, wherein, when the latest record that is stored in the start record table differs from the second application information, the sending includes sending information representing that the priority level is low as the response to the predetermined signal that is received from the communication device.

9. The computer-readable storage medium according to claim 7, the process further comprising extracting a combination of applications that are started consecutively on the basis of each consecutive record that is stored in the start record table, and generating the application relation table on the basis of the number of times for which the extracted combination is contained in the start records.

10. The computer-readable storage medium according to claim 9, wherein the extracting and generating includes determining, out of combinations of applications that are started consecutively, a combination of applications with a difference between times at which the applications are started, which difference is a predetermined time or shorter, as a combination of applications that is to be registered in the application relation table.

* * * * *